United States Patent
Biggerstaff et al.

(10) Patent No.: US 9,345,197 B2
(45) Date of Patent: May 24, 2016

(54) COMBINE HARVESTER WITH EVEN CROP DISTRIBUTION

(71) Applicant: AGCO Corporation, Duluth, GA (US)

(72) Inventors: Joseph Mark Biggerstaff, Wichita, KS (US); Craig Curtis May, Park City, KS (US)

(73) Assignee: AGCO Corporation, Duluth, GA (US)

( * ) Notice: Subject to any disclaimer, the term of this patent is extended or adjusted under 35 U.S.C. 154(b) by 145 days.

(21) Appl. No.: 14/273,013

(22) Filed: May 8, 2014

(65) Prior Publication Data

US 2014/0335923 A1    Nov. 13, 2014

Related U.S. Application Data

(60) Provisional application No. 61/821,781, filed on May 10, 2013.

(51) Int. Cl.
| | | |
|---|---|---|
| *A01D 75/18* | (2006.01) | |
| *A01F 12/16* | (2006.01) | |
| *A01F 21/00* | (2006.01) | |
| *A01F 7/04* | (2006.01) | |
| *A01D 41/127* | (2006.01) | |

(52) U.S. Cl.
CPC ............... *A01F 7/04* (2013.01); *A01D 41/127* (2013.01)

(58) Field of Classification Search
CPC ............. A01D 41/127; A01D 41/1276; A01F 12/442; G05B 13/0275; G01F 1/76
USPC ................................ 701/50; 460/5
See application file for complete search history.

(56) References Cited

U.S. PATENT DOCUMENTS

| | | | | |
|---|---|---|---|---|
| 3,847,160 | A * | 11/1974 | De Coene | A01D 41/02 460/150 |
| 4,180,081 | A | 12/1979 | Shaver | |
| 4,934,985 | A * | 6/1990 | Strubbe | A01D 41/127 460/4 |
| 5,769,712 | A * | 6/1998 | Honas | A01F 12/442 460/114 |
| 6,361,435 | B1 * | 3/2002 | Yamamoto | A01D 41/02 460/26 |
| 6,442,916 | B1 * | 9/2002 | Pope | A01D 41/1271 56/10.2 R |
| 7,771,260 | B2 * | 8/2010 | Ricketts | A01D 75/282 460/4 |
| 2003/0076118 | A1 * | 4/2003 | Adams | G01F 1/64 324/664 |
| 2004/0226275 | A1 * | 11/2004 | Baumgarten | A01D 41/1276 56/153 |

(Continued)

FOREIGN PATENT DOCUMENTS

| | | |
|---|---|---|
| EP | 2550851 A1 | 1/2013 |
| EP | 2740347 A1 | 6/2014 |

(Continued)

OTHER PUBLICATIONS

Intellectual Property Office, Search Report for UK Application GB1403738.6, dated Sep. 4, 2014.

*Primary Examiner* — Árpád Fábián-Kovács (57) ABSTRACT

A combine harvester has a thresher rotor assembly having a thresher rotor and a grate. At least one distribution device is disposed beneath the thresher rotor and is controllable to deflect grain falling from the thresher rotor assembly in a transverse direction. The distribution device may take the form of stub augers, pivoting plates or sliding plates. A cleaning shoe has a pan upon which grain falling from the thresher rotor assembly impacts. Plural sensors are disposed adjacent the pan and are each arranged to generate a signal indicative of crop load on the pan, wherein the distribution device is controlled automatically in response to the generated load signals.

7 Claims, 8 Drawing Sheets

(56) References Cited

U.S. PATENT DOCUMENTS

| | | |
|---|---|---|
| 2007/0149265 A1 | 6/2007 | Behnke et al. |
| 2007/0161422 A1* | 7/2007 | Behnke .................. A01F 12/52 460/1 |
| 2007/0270200 A1* | 11/2007 | Smith ................ A01D 41/1276 460/6 |
| 2009/0036184 A1 | 2/2009 | Craessaerts et al. |
| 2010/0217481 A1* | 8/2010 | Baumgarten ........ A01D 41/127 701/33.4 |
| 2013/0172057 A1* | 7/2013 | Farley ................ A01D 75/282 460/5 |
| 2014/0277960 A1* | 9/2014 | Blank ..................... G06F 11/30 701/50 |
| 2014/0277961 A1* | 9/2014 | Blank .................. A01D 41/127 701/50 |
| 2015/0080069 A1* | 3/2015 | Fuchs ................ A01D 41/1273 460/1 |

FOREIGN PATENT DOCUMENTS

| | | |
|---|---|---|
| FR | 2614497 A1 | 11/1988 |
| JP | 05252822 A | 10/1993 |
| JP | H05304829 A | 11/1993 |

\* cited by examiner

COMBINE HARVESTER WITH EVEN CROP DISTRIBUTION

CROSS REFERENCE TO RELATED APPLICATION

This application claims the benefit of U.S. Provisional Application No. 61/821,781, filed May 10, 2013, which is hereby incorporated by reference in its entirety.

BACKGROUND OF THE INVENTION

1. Field of Invention

The present disclosure is generally related to agriculture technology, and, more particularly, combine harvesters.

2. Description of Related Art

Combine harvesters are provided with a processing system comprising a thresher rotor assembly, as well as a cleaning system. The thresher rotor assembly typically comprises a thresher rotor or cylinder and one or more arcuate, foraminous concaves and separator grate assemblies, through which crop material threshed by the thresher rotor pass to the cleaning system. The threshed crop material may comprise kernels of grain, chaff, small pieces of stalk or straw, etc. The cleaning system is used to remove chaff and other residue from, for instance, the threshed grain. Within the cleaning system, an oscillating cascade pan and sieve assemblies of a shaker shoe assembly (hereinafter, also simply shoe) in conjunction with air flow remove the chaff from the threshed grain. The cleaned grain is conveyed to a discharge auger that elevates the grain to an onboard storage bin, whereas material other than grain (or MOG) and possibly unthreshed grain are directed over the edge of a bottom sieve assembly of the shoe to a different discharge outlet for recirculation back through the thresher rotor assembly and cleaning system to extract any unthreshed grain. A fan of the cleaning system produces an airstream through the shoe that entrains the lighter non-grain particles and carries them out the rear of the combine harvester.

The versatility of the combine harvester enables harvesting of many different crops under a variety of conditions. In turn, the variability in crops and conditions may provide challenges to combine harvester operations that affect the capacity of the shoe. In particular, irregular loading across the width of the shoe inherently results in some areas of the shoe working at less than optimal efficiency.

SUMMARY OF THE INVENTION

In accordance with the invention, there is provided a combine harvester comprising a thresher rotor assembly having a thresher rotor and a grate, the thresher rotor having a transverse rotation axis with respect to a forward direction of travel of the harvester, at least one distribution device disposed beneath the thresher rotor and being controllable to deflect grain falling from the thresher rotor assembly in a transverse direction, a cleaning shoe comprising a pan upon which grain falling from the thresher rotor assembly impacts, and, plural sensors disposed adjacent the pan and each arranged to generate a signal indicative of crop load on the pan, wherein the distribution device is controlled automatically in response to the generated load signals. Advantageously, by controllably deflecting the crop material falling from the thresher rotor in a transverse direction (that is width-wise) in response to a sensed load across the shoe, the distribution of material impacting upon the cleaning shoe can be evened out thus maximizing efficiency and capacity of the shoe.

The invention lends itself particularly well to combine harvesters having a transverse flow rotary threshing system wherein the threshing cylinder rotates on a transverse axis (aligned across the width of the harvester) and the crop material is fed at one end and passes in a spiral path around the cylinder before being ejected at the other opposite end. However, it will be appreciated that the invention is also applicable to tangential flow (conventional) threshing systems.

These and other features and advantages of this invention are described in, or are apparent from, the following detailed description of various exemplary embodiments of the systems and methods according to this invention.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, a combine harvester sensing method comprises sensing a crop material load on a shoe; and responsive to the sensed crop material load, independently adjusting at least one distribution device located above the shoe to adjust a distribution of crop material from threshing apparatus located above.

DETAILED DESCRIPTION

Certain embodiments of a combine harvester sensing system and method are disclosed that address the variability in crop material and/or environmental conditions involved in farming with a combine harvester by monitoring the manner in which threshed crop material is distributed on a shaker (or cleaning) shoe assembly (hereinafter, simply shoe). In one embodiment, one or more sensors are mounted at or within monitoring range of a cascade pan (hereinafter, simply pan) of the shoe, and one or more distribution devices (e.g., stub augers, moving slats, moving belts, baffle plates, blocking plates among other mechanisms for moving and distributing crop material discharged from a thresher rotor assembly) are disposed beneath a thresher rotor assembly, which in turn are disposed above the pan of the shoe. The sensor(s) monitor a crop material load (including a distribution of the crop material load) on the pan. Each distribution device may be independently adjusted (e.g., independent of adjustment of the speed of moving crop material relative to the speed of crop movement from one or more other distribution devices) based on feedback (e.g., control signal, load sense signal, such as in the form of an electronic signal, a fluid pressure change, etc.) from the sensor(s). The adjustments cause a change in speed of the respective distribution device, which in turn causes a change in a distribution of the crop material impacting the pan.

Digressing briefly, and using a transverse axial flow combine harvester as a non-limiting example, crop material from the thresher rotor assembly is typically discharged onto one or more distribution augers. The crop material from the distribution augers is discharged onto one or more accelerator rolls and accelerated down towards a cascade pan of the shoe and then conveyed (e.g., by well-known oscillating mechanisms) onto the oscillating sieve assemblies of the shoe. The stream of crop material from the accelerator rolls can be uneven from side-to-side, which may cause uneven loading of the shoe. Such uneven loading of the shoe may lead to losses and/or reduced performance. In contrast, certain embodiments of a combine harvester sensing system even out the stream of crop material that is discharged from the accelerator rolls through adjustments to one or more of the plural distribution conveyors based on feedback from the one or more sensors that monitor the pan load.

Having summarized certain features of combine harvester sensing systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on a combine harvester having a transverse-flow rotary design, though it should be appreciated within the context of the present disclosure that combine harvesters of other designs, such as hybrid, conventional, axial, or dual axial, may be used and hence are contemplated to be within the scope of the present disclosure. In addition, though emphasis is placed on distribution conveyors that are embodied as stub augers, it should be understood within the context of the present disclosure that other types of mechanisms for causing changes in distribution of the crop material discharged from the thresher rotor assembly and impacting one or more accelerator rolls may be used in some embodiments, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine harvester looking forwardly. In addition, note that reference herein to threshed crop material refers to crop material that has been processed by the thresher rotor, which may (or may not) include at least a small portion of unthreshed grain. References to "transverse" equate to side-to-side whereas "longitudinal" equates to a lengthwise axis parallel to the normal forward direction of travel of the machine.

Figure 1:
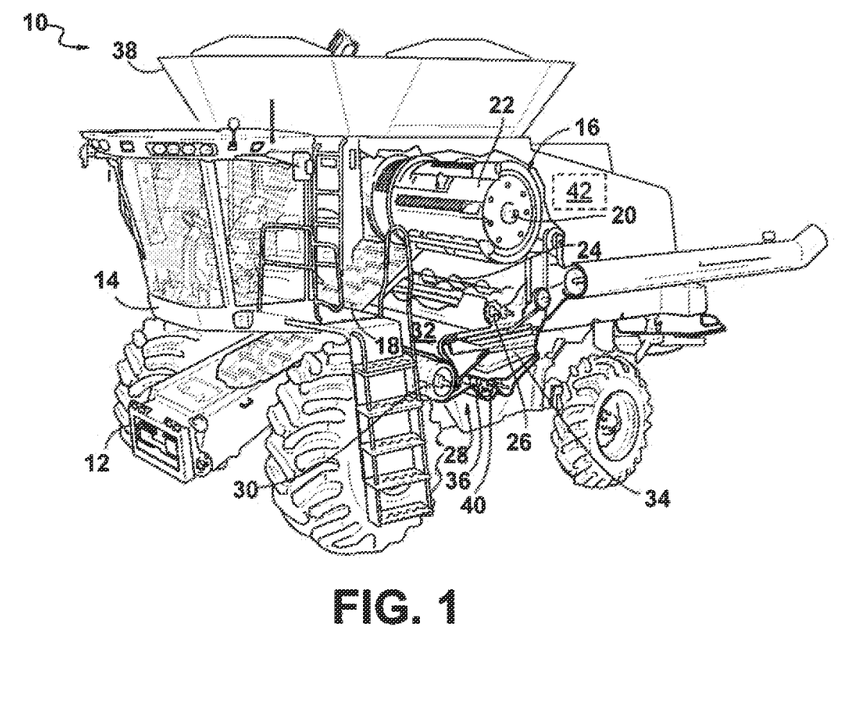
FIG. 1 is a schematic diagram, in partial cutaway view, of an example combine harvester in accordance with an embodiment of the invention and having a transverse flow rotary processor.

Referring now to FIG. 1, shown is an example combine harvester 10 in which an embodiment of a combine harvester sensing system may be implemented. The example combine harvester 10 is shown in FIG. 1 without a header, and from front to back, comprises a feeder house 12 and an operator cab 14, followed by a processing compartment that includes a processing system 16. In operation, the combine harvester 10 includes a harvesting header (not shown) at the front of the machine that cuts crop materials and delivers the cut crop materials to the front end of the feeder house 12. Such crop materials are moved upwardly and rearwardly within and beyond the feeder house 12 by a conveyor 18 until reaching a thresher rotor assembly comprising a thresher rotor (or cylinder) 20 of the processing system 16. The thresher rotor 20 comprises a single, transverse flow rotor, such as that found in a Gleaner® Super Series Combine by AGCO. The thresher rotor 20 processes the crop materials in known manner and passes a portion of the crop material (e.g., heavier chaff, corn stalks, etc.) toward the rear of the combine harvester 10 and another portion (e.g., threshed crop material such as grain and possibly light chaff) through well-known arcuate, foraminous concaves and separator grate assemblies to a cleaning system, as described below. In some embodiments the conveyor 18 may convey the cut crop material to a beater before reaching a rotor or rotors.

In the processing system 16, the crop materials undergo threshing and separating operations. In other words, the crop materials are threshed and separated by the thresher rotor 20 operating in cooperation with certain elements of the thresher rotor assembly, including a rotor cage 22, which includes well-known foraminous processing members in the form of threshing concave assemblies and separator grate assemblies; with the grain (and possibly light chaff) escaping through the concave assemblies (which may include a plurality of coupled, modular-structured concaves) and the grate assemblies and onto plural distribution conveyors embodied at least in part as stub-type distribution augers 24 located beneath the processing system 16.

Bulkier stalk and leaf materials are generally retained by the concave assemblies and the grate assemblies and are disbursed out from the processing system 16 and ultimately out of the rear of the combine harvester 10. In one embodiment, each of the distribution augers 24 are independently controlled (e.g., considering a pair of distribution augers, one is adjustable in a performance parameter such as speed relative to a different speed adjustment (if adjusted) of the other) and collectively cause an even (e.g., uniform from side-to-side) spread of the crop material that falls upon it, with the spread crop material conveyed to plural (e.g., two, but the quantity may be greater or fewer in some embodiments) accelerator rolls 26. The accelerator rolls 26 speed the descent of the threshed crop material (e.g., propel it) toward a cleaning system 28. Also shown is a transverse, air blowing apparatus 30 (e.g., fan, or equivalently, a blower), which discharges pressurized air through one or more ducts, such as ducts 32 (e.g., which in one embodiment, includes an upper duct and lower duct, though not limited to two ducts), to the cleaning system 28 to facilitate the cleaning of the heavier crop material directly beneath the accelerator rolls 26 while causing the chaff to be carried out of the rear of the combine harvester 10. The cleaning system 28 includes a shoe comprising plural stacked sieves 34 (e.g., also referred to herein as an oscillating sieve assembly), through which the fan 30 provides an additional push or influence (through a lower duct 32) of the chaff flow to the rear of the combine harvester 10. The cleaned grain that drops to the bottom of the cleaning system 28 is delivered by an auger 36 that transports the grain to a well-known elevator mechanism (not shown), which conveys the grain to a grain bin 38 located at the top of the combine harvester 10. Any remaining chaff and partially or unthreshed grain is recirculated through the processing system 16 via a tailings return auger 40. As combine processing and cleaning is known to those having ordinary skill in the art, further discussion of the same is omitted here for brevity.

The example combine harvester 10 also comprises a controller 42 (shown schematically). Though depicted in phantom rearward of the thresher rotor 20, the controller 42 may be located elsewhere on the combine harvester 10 in some embodiments. In one embodiment, the controller 42 receives a signal or signals from one or more sensors of a combine harvester sensing system that sense the crop material load on the pan of the shoe, and causes the adjustment of hydraulic fluid flow through a valve (or causes a change in speed of one or more electric motors in some embodiments, omitting the valve). The valve (not shown in FIG. 1) controls the flow of hydraulic fluid to hydraulic motors that drive the distribution augers 24, as described further below.

In some embodiments, the controller 42 may be implemented at least in part as hardware circuitry, including any or a combination of the following technologies, which are all well-known in the art: analog or digital circuitry, a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc. In some embodiments, the controller 42 may be implemented at least in part as software (including firmware), where programming for responding to feedback from sensors and/or causing actuation at one or more valve(s), pumps, and/or motors may be encoded on one of a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

Figure 2:
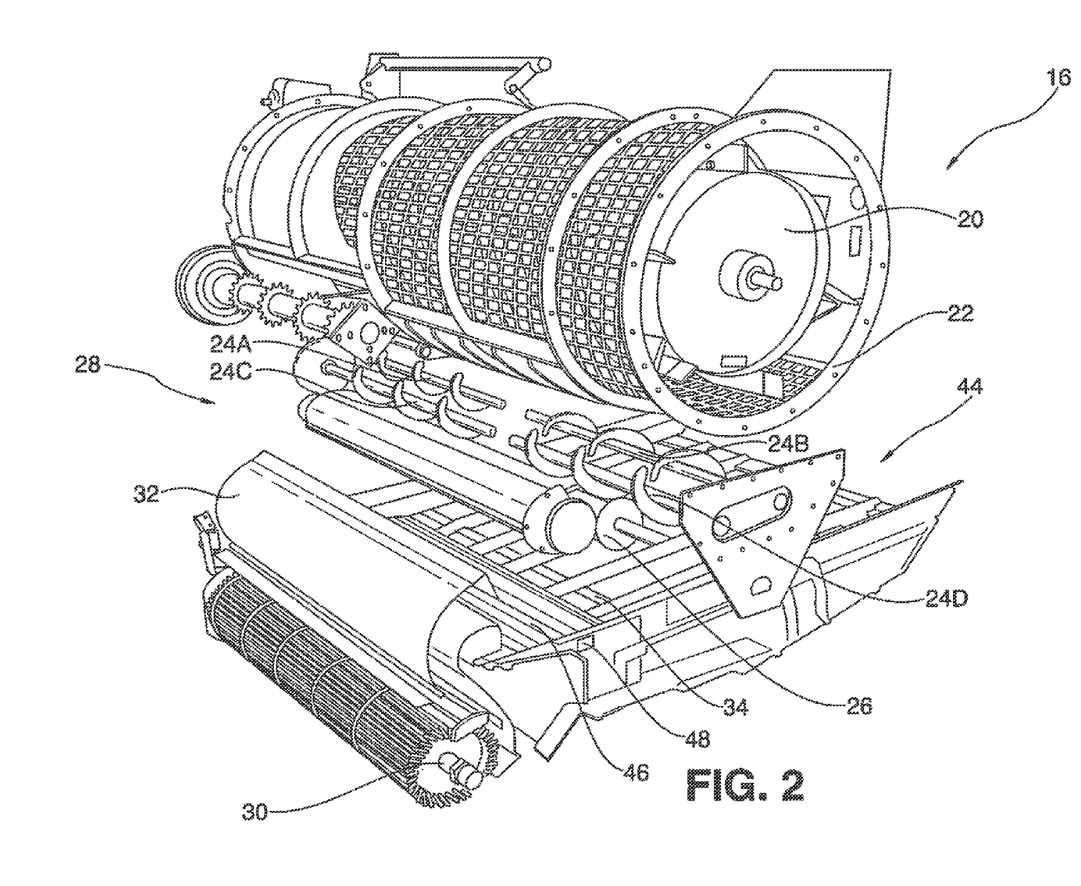
FIG. 2 is a schematic diagram illustrating in a fragmentary, front perspective view a thresher rotor assembly and shoe and select components of the combine harvester of FIG. 1.

FIG. 2 is a fragmentary view of the processing system 16 and cleaning system 28 of FIG. 1, which provides a perspective of one example arrangement of the distribution augers 24. It should be appreciated within the context of the present disclosure that some embodiments may include additional components or fewer or different components, and that the example depicted in FIG. 2 is merely illustrative of an example environment in which an embodiment of a combine harvester sensing system may be implemented. Starting from the top, shown is the thresher rotor 20 of the processing system 16, the thresher rotor 20 surrounded and supported by the rotor cage 22. The plural distribution augers 24 are disposed beneath the thresher rotor 20, and include in this depicted embodiment, four (4) stub-type distribution augers 24A, 24B, 24C, and 24D. Other arrangements and/or quantities of distribution augers 24 may be used in some embodiments, including some non-exhaustive variations described below and illustrated in FIGS. 7A-7D. In some embodiments, other types of distribution devices may be used, including a mix of different types of distribution conveyors and including the alternatives illustrated in FIGS. 9A and 9B. The plural distribution augers 24 are located above the plural accelerator rolls 26. Also shown is the cleaning system 28, which includes in one embodiment the fan 30, duct 32, and a shoe 44. The shoe 44 includes the oscillating sieve assembly 34, which in one embodiment includes a pan (e.g., cascade pan) 46 which provides a target area for the initial deposit of the threshed crop material propelled from the accelerator rolls 26. Oscillating movement of the pan 46 causes the conveyance rearward of the threshed crop material to other oscillating parts of the shoe 44, though other mechanisms of conveying the crop material from the pan may be used in some embodiments.

In one embodiment, plural sensors 48 (one shown in FIG. 2 schematically) are disposed adjacent the pan 46. In one embodiment, the sensors 48 may be disposed adjacent (and in contact mechanically with the pan 46 or subject to the load of the pan, such as part of the support for the pan 46) the rear of the pan 46 on opposing sides of the pan 46. The sensors 48 may be configured as load sensors, position sensors, hydraulic pressure sensors (e.g., cylinders), among others well-known in the art. In some embodiments, one or more additional sensors may be located toward the rear of the pan 46 between the sensors located at the opposing rear sides of the pan 46. In some embodiments, the sensors 48 may be located more remotely from the pan 46, yet within monitoring range (e.g., not in contact, such as through the use of acoustic type sensors among other non-contact sensor types (e.g., capacitive and/or magnetic sensors, infrared sensors, or sensors that operate under other electromagnetic spectrums, among other types of sensors that can detect the crop material)). Though the use of plural sensors 48 is emphasized herein, it should be appreciated within the context of the present disclosure that some embodiments may use a single sensor that is capable of monitoring the load and distribution of the crop material set upon the pan 46. In some embodiments, the controller 42 may be used to determine the crop material load distribution based on the sensed feedback. In one embodiment, each of the sensors 48 may be of the same type, though some embodiments may use sensors of different types. In some embodiments, the placement of the sensors 48 may be achieved in such a manner where the weight of the pan and crop material load is supported in part by the sensors 48.

Figure 3:
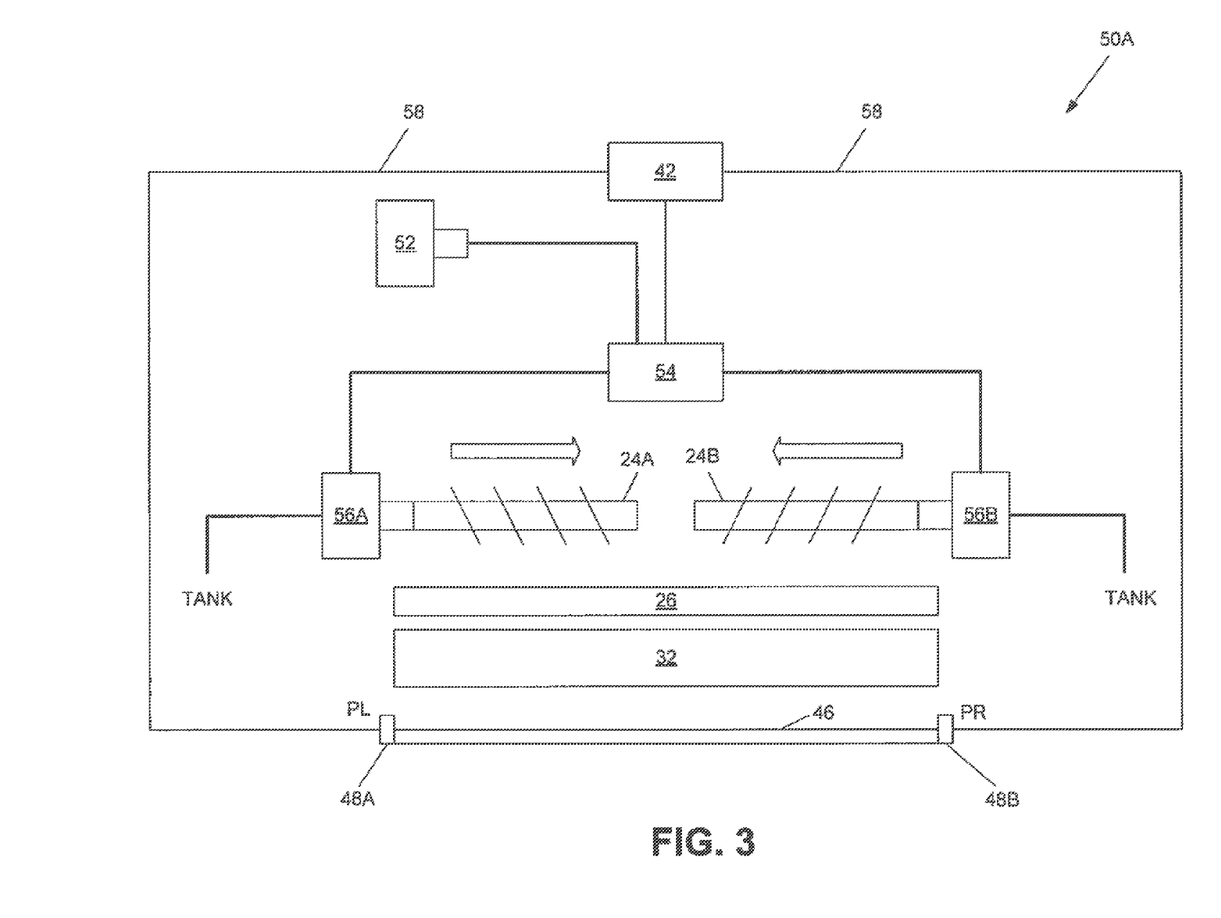
FIG. 3 is a block diagram illustrating in a fragmentary, rear elevation view an embodiment of a combine harvester.

Referring now to FIG. 3, shown, in block diagram form, is a fragmentary, rear elevation view of select components of the combine harvester 10 (FIG. 1), including an embodiment of an example sensing system 50A. Shown partially is an upper portion of the fan duct 32. In one embodiment, the sensing system 50A comprises (viewing from the top-down), the controller 42, a hydraulic pump 52, and a valve 54 fluidly coupled to the hydraulic pump 52 and electrically coupled (e.g., wired, or in some embodiments, wirelessly) to the controller 42. The hydraulic pump 52 provides a source of flow of hydraulic fluid to hydraulic motors 56 (described below) through the valve 54, which splits the flow from the hydraulic pump 52 to the hydraulic motors 56. Though depicted in FIG. 3 as separate from the valve 54, it should be appreciated by one having ordinary skill in the art that the controller 42 may be physically secured to the valve 54 in some embodiments, including integrated collectively as a package. In some embodiments, more than a single valve may be used, with the incoming flow going to each valve (e.g., a parallel configuration) or plural hydraulic pumps feeding each valve in some embodiments, or plural hydraulic pumps and a valve (or more) in some embodiments, with each pump feeding a respective hydraulic motor or set of motors). The example system 50A further comprises plural, independently-controlled hydraulic motors 56, including hydraulic motor 56A (left-hand side) and hydraulic motor 56B (right-hand side). The hydraulic motors 56 are fluidly coupled to one or more on-board fluid reservoirs or tanks (denoted, "tanks' in FIG. 3), and also fluidly coupled to the valve 54. Note that the sensing system 50A depicted in FIG. 3 may be implemented as either an open or closed-loop hydraulic system, as should be appreciated by one having ordinary skill in the art in view of the disclosure. The hydraulic motor 56A drives, through well-known mechanisms, the distribution auger 24A. The hydraulic motor 56B drives, through well-known mechanisms, the distribution auger 24B. For instance, based on the hydraulic fluid flow to the hydraulic motors 56A and 56B from the valve 54, one of the hydraulic motors (e.g., 56A) may drive the distribution auger 24A at a lower speed that the speed at which the hydraulic motor (e.g., 56B) drives the distribution auger 24B. In this sense, the hydraulic motors 56A and 56B are independently controlled (given their ability to drive the distribution augers 24 at different speed based on the ability to receive different hydraulic fluid flows at any given moment in time), as are the distribution augers 24A and 24B (given their ability to rotate at different speeds at any given moment in time). In some embodiments, one or more additional distribution augers 24 may be used in conjunction with the distribution augers 24A and 24B, such as disclosed in FIG. 2. Right-pointing and left-pointing arrows shown above respective distribution augers 24A and 24B indicate the direction along the distribution augers 24A and 24B from which the crop material is predominantly dispensed from the distribution augers 24A and 24B. For instance, by speeding up the rotation of the distribution augers 24A and/or 24B, more crop material is conveyed in the respective directions of the arrows (and hence distributed from the distribution augers 24A and/or 24B to the accelerator rolls 26 according to the shift of the conveyed crop material). Similarly, by slowing down the speed of rotation of the distribution augers 24A and/or 24B, less material is conveyed in the directions indicated by the respective arrows. In this manner, the adjustment of the speed of the distribution augers 24 by the hydraulic motors 56 causes a change in the distribution of crop material discharged from the distribution augers 24 and ultimately, a change in the distribution of the crop material load on the shoe 44 (FIG. 2). Stated otherwise, the speed of the distribution augers 24 affects where the crop material enters the accelerator rolls 26.

The combine harvester further comprises accelerator rolls 26, which are disposed beneath the distribution augers 24, and the pan 46 of the shoe 44 (FIG. 2), which is disposed beneath the accelerator rolls 26. The combine harvester further comprises the pan 46, upon which the crop material is discharged from the accelerator rolls 26, and the plural (e.g., two (2) shown, though not limited to two) sensors 48A (left-hand side) and 48B (right-hand side) located at opposing ends of the pan 46. The sensors 48 may detect movement of the pan 46 that is based on a change in crop material load. In some embodiments, particularly for image-type sensors, the sensors (or processing associated with the sensors done at, or remote from, the pan 46) may determine a depth of the crop material and correlate the same to the load.

Figure 4:
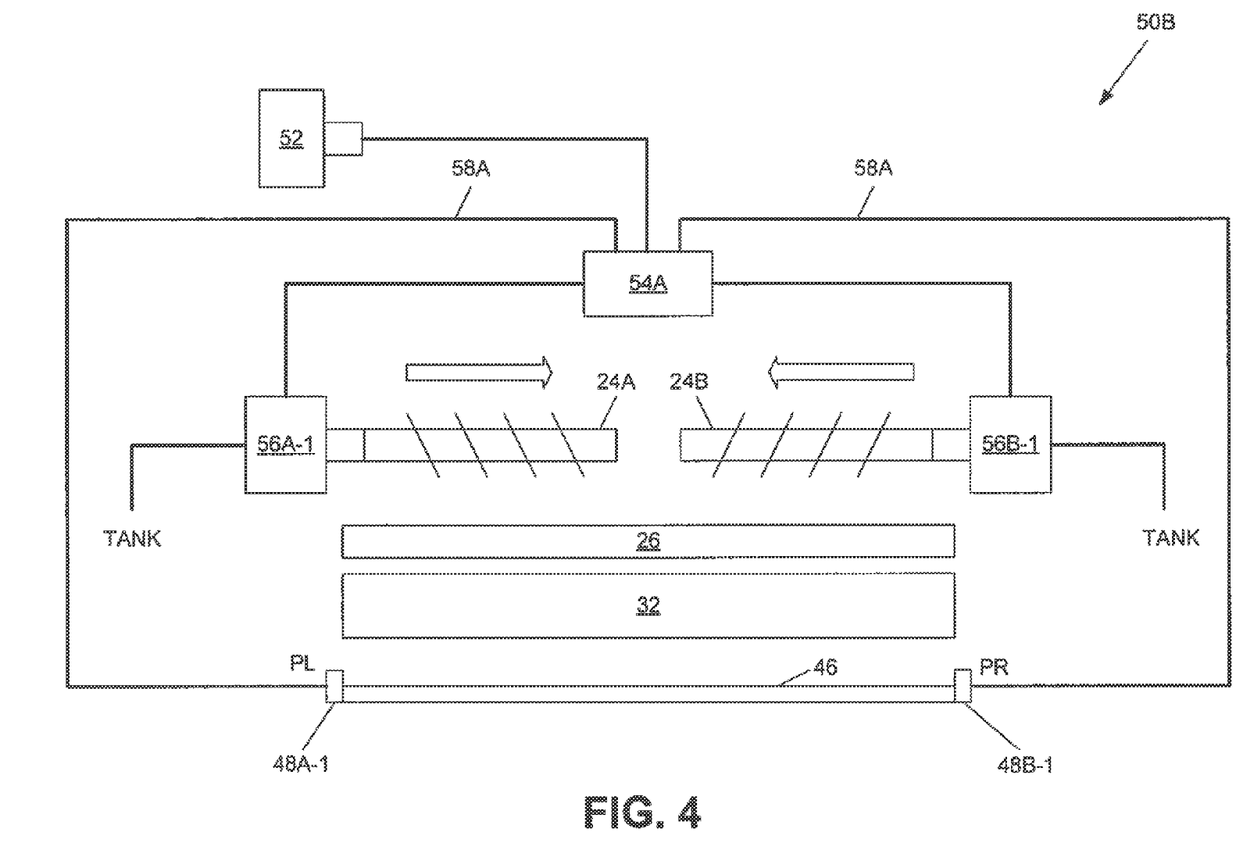
FIG. 4 is a block diagram illustrating in a fragmentary, rear elevation view another embodiment of a combine harvester sensing system.

In one example operation, signals from the sensors 48 may be delivered to the controller 42 over load sense lines 58, which are shown with lighter line thickness in FIG. 3 and FIG. 4 to represent electrical (or wireless) lines versus the thicker hydraulic lines shown more bold. For instance sensor 48A may provide a load signal, PL (e.g., left pressure signal, such as corresponding to a crop material load pressure detected on the left-hand side of the pan 46), to the controller 42, and the sensor 48B may provide a load signal, PR (e.g., right pressure signal, such as corresponding to a crop material load pressure detected on the right-hand side of the pan 46) to the controller 42. The signals may be delivered wirelessly, and in some embodiments, the sensors 48 may comprise all or some of the functionality of the controller 42. Continuing the example depicted in FIG. 3, the controller 42 compares values for PL and PR, and based on the comparison, provides a control signal (e.g., stroke control signal) to the valve 54. For instance, if PL (e.g., the value of PL, such as indicated by an amplitude level in voltage or current, or as a digital signal (e.g., with a modulated pattern or code)) is greater than PR (e.g., a value for PR, similar to PL as described above), such a condition corresponds to the detection of more crop material load on the left-hand side of the pan 46, as detected by the sensor 48A, than the crop material load detected by the sensor 48B on the right-hand side of the pan 46. Alternatively, if PL is less than PR, then there is more crop material load on the right-hand side of the pan 46 as detected by the sensor 48B than the crop material load detected by the sensor 48A on the left-hand side.

Assuming PL is greater than PR, then the controller 42 determines that PL is greater than PR, and provides a stroke control signal (e.g., over a wired or wireless medium) that causes the flow of hydraulic fluid flowing from the hydraulic pump 52 through the valve 54 to be increased through corresponding inlet and outlet ports on the valve 54 feeding the hydraulic motor 56A. By increasing the flow, the hydraulic motor 56A causes the rotation of the distribution auger 24A to speed up, which results in crop material discharged from the distribution auger 24A to be distributed more aggressively to the right (e.g., in the direction of the arrow above the distribution auger 24A) relative to the crop material discharged from the distribution auger 24B. Such an adjustment in the speed of the distribution auger 24A causes the crop material load on the pan 46 to be more evenly distributed. Further, it is noted that the control of the distribution auger 24A is independent of the control of distribution auger 24B, as explained above.

If PL is less than PR, a similar process ensues, resulting in the hydraulic motor 56B increasing the speed of rotation of the distribution auger 24B to move the distribution of crop material from the distribution auger 24B more toward the left to even out the crop material load distribution on the pan 46. Similar to the above-described example condition, it is noteworthy that the control of the distribution auger 24B is independent of the control of the distribution auger 24A (e.g., different speeds).

Note that variations to the above-described manner of control for the combine harvester sensing system 50A may be implemented. For instance, regardless of the condition (e.g., whether PL is greater than PR or less than PR), each distribution auger 24A, 24B may be adjusted to compensate for the detected uneven crop material load distribution. In one embodiment, using the example where PL is greater than PR, the controller 42 may cause the flow to the hydraulic motor 56A to increase while also causing the flow to the hydraulic motor 56B to decrease. For instance, opening an inlet port to the valve 54 may cause more flow to the left, which may cause a lower flow (due to higher resistance to flow) through the inlet port to the right (resulting in a reduced hydraulic motor 56B speed). As another example, the controller 42 may signal to the valve 54 to open the port that feeds the hydraulic motor 56A, and if the valve control elements (e.g., which open or close each of the ports) have a common shaft, the opening of one port area naturally results in the closing of the other port area. As yet another example, in the case where control elements of the valve are independently adjustable (e.g., not a common shaft), the controller 42 may signal the valve to open up one port of the valve 54 feeding one hydraulic more 56A, and at the same or similar time, signal the valve 54 to close another port of the valve 54 feeding another hydraulic more 56B.

Although FIG. 3 is described in the context of hydraulic motors 56A and 56B, it should be appreciated that, with some modification, the embodiment depicted in FIG. 3 can be used in conjunction with electric motors. For instance, the valve 54 may be omitted, and the controller may be directly coupled to respective electric motors that replace hydraulic motors 56A and 56B. Under this example arrangement, the sensors 48A and 48B provide feedback to the controller 42, which in turn communicate a control signal to one or both of the electric motors to adjust the speed of rotation of the distribution augers that are independently driven by the motors. Though described in accordance with a master-slave approach to control, variations in the manner of control may be implemented using, for instance, a peer-to-peer approach. For instance, in one embodiment, each sensor 48A and 48B may be packaged with its own respective controller (e.g., having functionality of the controller 42), and through peer-to-peer communication with each other sensor-controller package, determines which load is greater and hence signals directly to its own respective motor when there is a load imbalance to make the necessary adjustments. Similarly, in some embodiments, each electric motor may be packaged with its own controller, and each sensor 48A and 48B signal to their own respective motor-controller, which communicate in peer-to-peer fashion to determine whether there is a load imbalance, and if so, one or more of the motor-controller packages makes the necessary adjustments to the speed of the coupled distribution auger. Other forms of control (e.g., whether in master-slave or peer-to-peer relationships, or a hybrid of both) may be used, as should be appreciated by one having ordinary skill in the art in the context of the present disclosure, and hence are contemplated to be within the scope of the disclosure.

With reference to FIG. 4, shown is another embodiment of a combine harvester sensing system 50B that relies more on hydraulic mechanisms for control than the system 50A of FIG. 3. Shown is the upper fan duct 32, as also shown in FIG. 3. The system 50B comprises similar components to those depicted in FIG. 3, including (from top-down) the hydraulic pump 52, the distribution augers 24A and 24B, the accelerator rolls 26, and the pan 46. Where the combine harvester sensing system 50B differs from the combine harvester sensing system 50A of FIG. 3 is in the omission of a controller 42, the use of combination hydraulic pump/motors 56A-1 and 56B-1 (hereinafter, hydraulic motors, though some embodiments may use merely hydraulic motors), the use of hydraulic load sense lines 58A (instead of electrical control lines or medium), the use of a balanced load sense valve, denoted as valve 54A, and the use of hydraulic cylinders for the sensing functionality, denoted and described as sensors 48A-1 and 48B-1 for the left and right sensor positions relative to the pan 46, respectively. Overall, the manner of control is similar to that described in association with FIG. 3. For instance, in the combine harvester sensing system 50B, the hydraulic motors 56A-1 and 56B-1 draw a flow of hydraulic fluid from the hydraulic pump 52 via the valve 54A. The valve 54A adjusts the flow that is conveyed through the valve 54A. Note that the combine harvester sensing system 50B depicted in FIG. 4 may be implemented as either an open or closed-loop hydraulic system, as should be appreciated by one having ordinary skill in the art in view of the disclosure. The adjustment in the flow to each of (or at least one of) the hydraulic motors 56A-1 and/or 56B-1 results in a change in speed of the respectively driven distribution auger 24A and/or 24B. If the right sensor 48B-1 senses more crop material load (e.g., pressure) at the right-hand side area of the pan 46, then more crop material is impacting that area of the pan 46. Accordingly, through mechanisms described below, the right-hand side distribution auger 24B runs faster (due to the passage of more hydraulic fluid flow enabled through the valve 54A) to move more crop material to the left-hand side to create an even crop material load distribution on the pan 46.

Similarly, if the left sensor 48A-1 senses more crop material load (e.g., pressure) at the left-hand side area of the pan 46, then more crop material is impacting that area of the pan 46. Accordingly, the left-hand side distribution auger 24A runs faster (due to the passage of more hydraulic fluid flow enabled through the valve 54A) to move more crop material to the right-hand side to create an even crop material load distribution on the pan 46.

As to implementation differences between the combine harvester sensing system 50A of FIG. 3 and the combine harvester sensing system 50B of FIG. 4, the sensors 48A-1 and 48B-1 are embodied as hydraulic cylinders (among other types of mechanical-type sensors), which detect a difference in pressure due to the change in load of the respective monitored side of the pan 46. Using the right-hand side of FIG. 4 as an illustrative example, with similar applicability to the left-hand side, if the sensor 48B-1 detects more load (e.g., an increased load) on the corresponding side of the pan 46, the pressure increases on the cylinder (the sensor 48B-1), which places more pressure, PR, on the hydraulic fluid in the right-hand side load sense line 58A. The valve 54A, responsive to the change in pressure in the load sense line 58A, effects a stroke (e.g., of a piston, stem, etc.) to enable more hydraulic fluid flow (e.g., drawn from the hydraulic pump 52 by the motor 56B-1) through the valve 54A and to the right-hand side hydraulic motor 56B-1. The increased flow to the right-hand side hydraulic motor 56B-1 causes the distribution auger 24B to speed up (e.g., increased rotational speed), causing the crop material to move more to the left-hand side to even out the material crop load distribution. Thus, the control mechanisms are implemented through hydraulics, with electrical power limited to the source of power to one or more components of the combine harvester sensing system 50B.

Figure 5A:
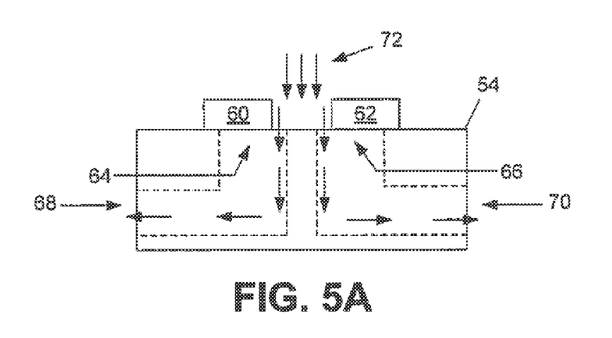
FIGS. 5A-5B are block diagrams that illustrate in fragmentary, front elevation views an embodiment of a valve used in an embodiment of a combine harvester sensing system.
Figure 5B:
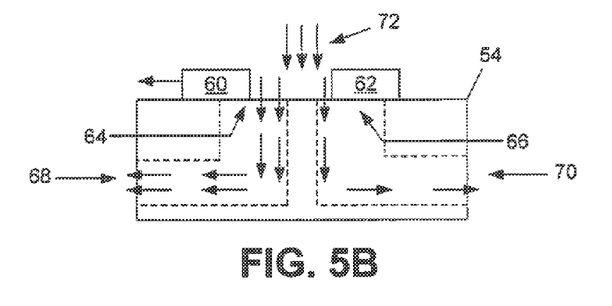
Figure 6:
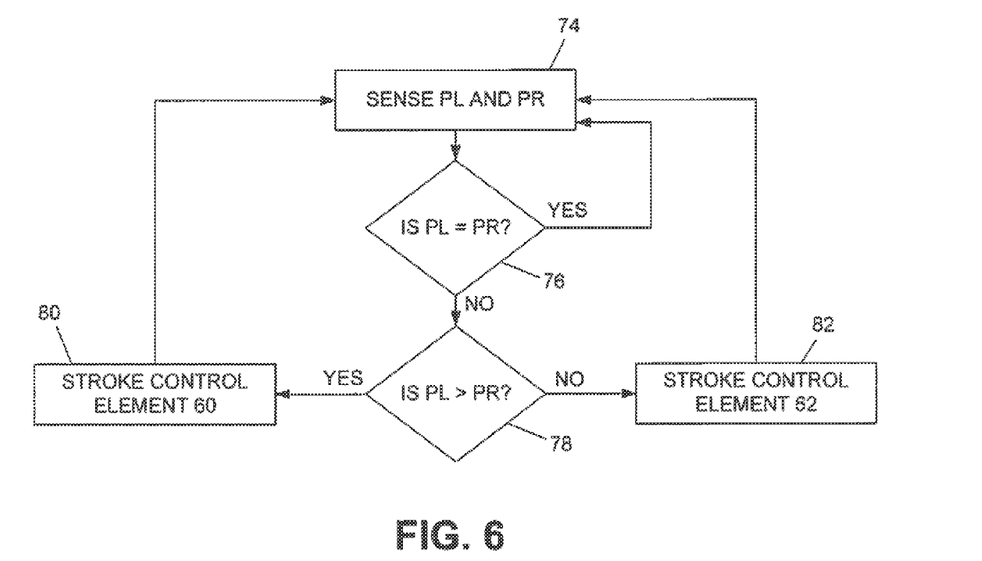
FIG. 6 is a flow diagram that illustrates an embodiment of an example method for stroking the valve of FIGS. 5A and 5B based on sensed load at a pan of a shoe of a combine harvester.

FIGS. 5A, 5B, and 6 illustrates, conceptually, an example mechanism by which the valve (e.g., 54, 54A) enables a change in fluid flow. It should be appreciated within the context of the present disclosure that the block diagrams of the valves 54 depicted in FIGS. 5A-5B are merely illustrative of the principles in which hydraulic fluid flow is controlled through the valve 54, and that some embodiments of the combine harvester sensing system 50 (e.g., 50A, 50B) may use other types of valves and/or valve mechanisms, and hence are contemplated to be within the scope of the disclosure. Referring to FIGS. 5A and 5B, the valve 54 comprises control elements 60 and 62 which move bi-directionally across (e.g., open and close) respective inlet ports 64 and 66 of the valve

54. In some embodiments, instead of a modulated form of control (which is described in this example), the control may be implemented as a full-open/full-close (e.g., which may include biasing, such as via spring-assist actuation) manner of flow control to cause adjustments in hydraulic fluid flow. The control elements 60 and 62 may be embodied as any structure that controls the passage of flow into or out of the valve 54, including discs, paddles, globes, ball, cartridge, among others well-known in the art. The control elements 60 and 62, as is known, may be opened and closed through movement of one (e.g., common) or more (e.g., individual) pistons, shafts, stems, etc., as actuated by a solenoid or other actuator. For instance, the control elements 60 and 62 may be coupled to a common shaft, and when control element 60 is opened (e.g., moves to the left in FIG. 5A) to enable more fluid to flow into inlet port 64, the control element 62 moves correspondingly to the left to close off flow to the inlet port 66. It is noted that embodiments where the control elements 60 and 62 are independently controlled, fluid flow area may be changed to one inlet port while remaining constant (or adjusted as well, such as in an opposing direction to that of the one inlet port) in another inlet port. The valve 54 also comprises outlet ports 68 and 70. Fluid flow, such as from the hydraulic pump 52 (FIG. 3), is denoted as fluid flow 72, and is split by the valve 54 into the inlet port 64 and the inlet port 66. Note that the fluid may be received over hydraulic sense lines 58A (FIG. 4) in some embodiments.

Referring to FIG. 5A, the fluid flow 72 is evenly split as it passes into a respective area of the inlet ports 64 and 66 (e.g., the portion of the inlet not blocked by the control elements 60 and 62, respectively). The fluid flow continues through the valve 54 and out of the outlet ports 68 and 70 to feed to the respective hydraulic motor 56A and 56B (FIG. 3).

In FIG. 5B, the control element 60 moves to open more area of the inlet port 64, whereas the control element 62 remains fixed in position (or closes in some embodiments, such as where there is a common shaft or a need to close via independent control), enabling more fluid flow 72 through the inlet port 64 and out of the outlet port 68 to cause the hydraulic motor 56A to increase the speed of the distribution auger 24A.

Referring to FIG. 6, with continued reference to FIGS. 3 and 5A-5B, shown is a method employed by an embodiment of the combine harvester sensing system 50 in actuating the valve 54 to enable the change in hydraulic fluid flow 72 through the valve 54. In (74), the sensors 48A and 48B sense the crop material load at the pan 46, and signal PL and PR to the controller 42. The controller determines whether PL is equal to PR (76). If there is no difference (e.g., are equal, or "Yes" for (76) in FIG. 6), processing returns to (74). Note that some embodiments may make such a determination based on a threshold difference. For instance, if the difference in load is within a tolerance of a defined percentage or other value, then the controller 42 determines that there is no difference for purposes of this control algorithm (and hence processing returns to (74)). If there is a difference between PL and PR (e.g., "No" for (76) in FIG. 6), then the controller 42 determines where the crop material load imbalance exists (78). For instance, if PL is greater than PR (e.g., "Yes" for (78) in FIG. 6), then the controller 42 strokes the control element 60 (e.g., to move left in FIGS. 5A-5B or open) (80), which causes the increase in hydraulic fluid flow 72 through the inlet port 64, out of the outlet port 68, and to the left-hand side hydraulic motor 56A. The increased flow to the hydraulic motor 56A causes an increase in speed (e.g., of rotation) of the distribution auger 24A, which evens out the crop material load. If PL is less than PR (e.g., "No" for (78) in FIG. 6), then the controller 42 strokes the control element 62 (e.g., to move rightward in FIGS. 5A-5B or open) (82), which enables more hydraulic fluid flow 72 into the inlet port 66, out of the outlet port 70, and to the right-hand side hydraulic motor 56B. The increased flow to the hydraulic motor 56B causes an increase in speed (e.g., of rotation) of the distribution auger 24B, which evens out the crop material load. Note that in the case of a common shaft between the control elements 60 and 62, signaling may be limited to a single control element (e.g., 60 or 62), wherein the signal may cause a right or left movement that inherently causes corresponding movement to the other control element.

Although FIGS. 5A-6 are focused on the combine harvester sensing system 50A depicted in FIG. 3, it should be appreciated within the context of the present disclosure that similar principles apply for the combine harvester sensing system 50B of FIG. 4. Further, variations to the above process depicted in FIG. 6 may be applied, such as independently causing movement (e.g., in opposing directions) of both control elements 60 and 62, and/or omitting the controller 42 and replacing with inherent decision-making functionality of the balanced load sense valve 54A.

Figure 7A:
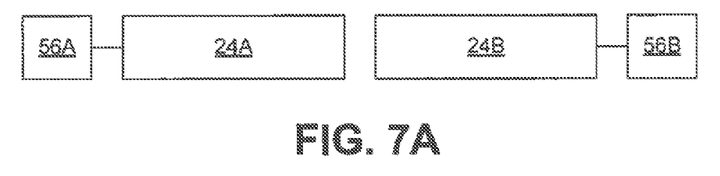
FIGS. 7A-7D are block diagrams illustrating, in overhead plan view, some example variations in arrangement of distribution conveyors of certain embodiments of a combine harvester.

Reference is now made to FIGS. 7A-7D, which illustrate in block diagram, overhead view, variations in distribution auger arrangements and control, with the understanding that the auger arrangements also apply to other types (or mix) of distribution conveyors. It should be understood that the depicted arrangements assume that the accelerator rolls reside beneath the distribution augers. Referring to FIG. 7A, one example arrangement consists of a pair of distribution augers 24A and 24B, with no other distribution augers for distributing the crop material onto the accelerator rolls 26 (FIG. 2). Each distribution auger 24A and 24B is independently controlled by a respective hydraulic motor 56A and 56B (or electric motor in such embodiments replacing hydraulic with electric motors). Note that, although reference is to the embodiment and/or driving mechanisms of FIG. 3, the aforementioned variations to the embodiments of FIG. 3 and embodiment(s) and/or variations of FIG. 4 also apply (e.g., hydraulic pump/motors, electric or magnetic motors, etc.).

Figure 7B:
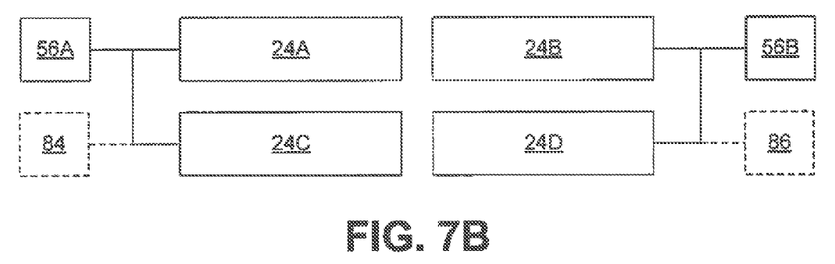

In FIG. 7B, there are four (4) distribution augers 24A, 24B, 24C, and 24D. In one embodiment, the hydraulic motor 56A drives, simultaneously, distribution augers 24A and 24C (e.g., via a common belt, chain, etc.). Similarly, the hydraulic motor 56B drives, simultaneously, the distribution augers 24B and 24D. The hydraulic motor 56A is independently controlled relative to the hydraulic motor 56B.

In some embodiments, additional hydraulic motors 84 and 86 (shown in phantom) may be used to drive distribution augers 24C and 24D, respectively. In one embodiment, all four (4) hydraulic motors 56A, 56B, 84, and 86 may be independently controlled, and in some embodiments, hydraulic motors 56A and 84 may be under common control, yet collectively independently controlled relative to hydraulic motors 56B and 86 (which may be commonly controlled).

Figure 7C:
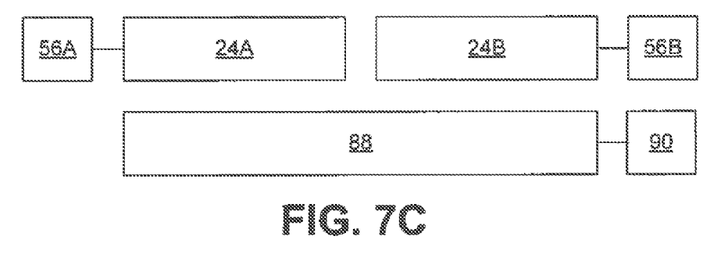

With reference to FIG. 7C, shown are the independently controlled hydraulic motors 56A and 56B driving respective distribution augers 24A and 24B. Also shown in this example arrangement is an additional, full-length distribution auger 88, which is driven by its own dedicated hydraulic motor 90. In one embodiment, the hydraulic motor 90 may drive the distribution auger 88 at a constant-speed, or in some embodiments, a variable speed (e.g., based on sensed conditions (e.g., crop material load) at the pan 46 (FIG. 1), or in some embodiments, based on operations of one or more of the other hydraulic motors 56A and/or 56B).

Figure 7D:
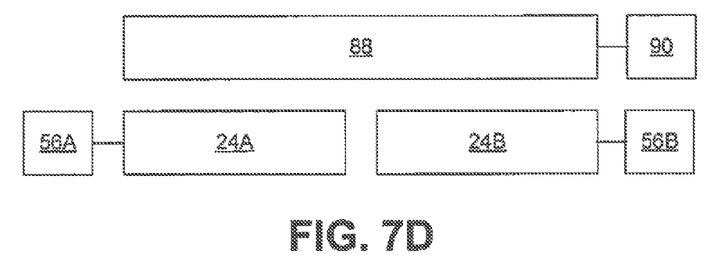

FIG. 7D is merely a reversal (relative to front and back) in the placement of the full-length distribution auger 88 and corresponding hydraulic motor 90 relative to the distribution augers 24A and 24B and corresponding hydraulic motors 56A and 56B.

Figure 8:
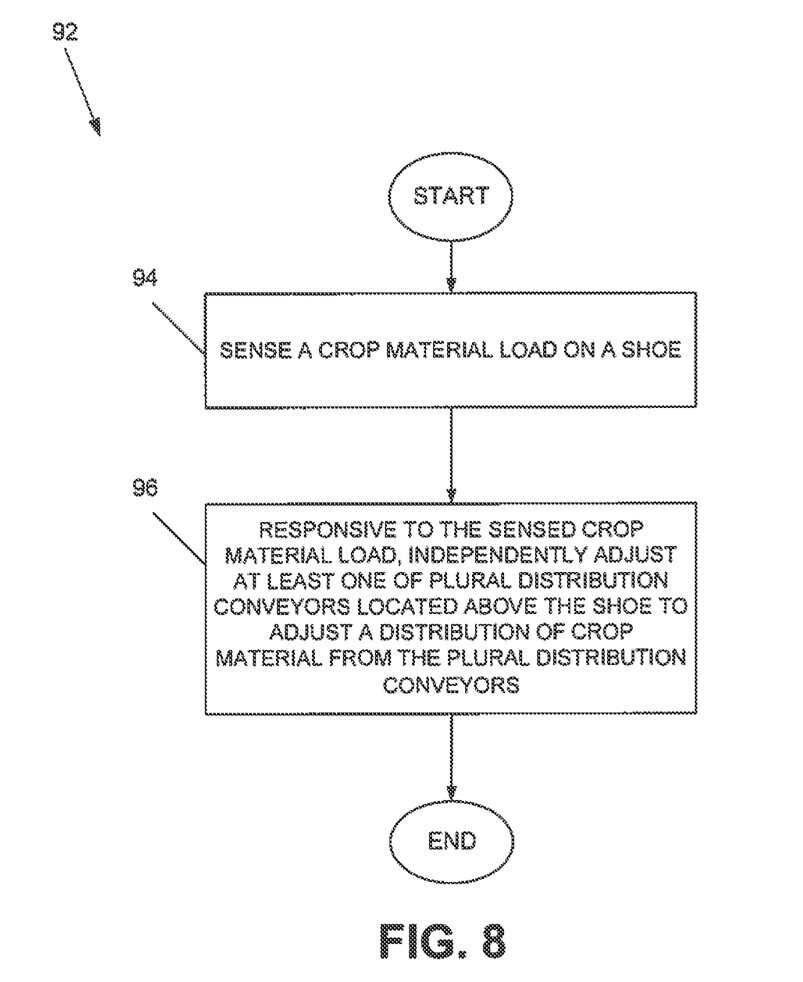
FIG. 8 is a flow diagram that illustrates an embodiment of a combine harvester sensing method.

Having described certain embodiments of a combine harvester sensing system 50, it should be appreciated within the context of the present disclosure that one embodiment of a combine harvester sensing method, denoted as method 92 as illustrated in FIG. 8, comprises sensing a crop material load on a shoe (94); and responsive to the sensed crop material load, independently adjusting at least one of plural distribution conveyors located above the shoe to adjust a distribution of crop material from the plural distribution conveyors (96).

Note that in some embodiments, an operator may become involved in the sensing and load distribution process. For instance, the controller 42 (FIG. 1) may communicate with a computer system residing on the combine harvester (or remotely in some embodiments), or in some embodiments, be configured for additional combine harvester operational functionality and/or control. As one example, the signal(s) from the sensors 48 (or as translated from the pressures detected in the hydraulic load sense lines 58A) may be used to display a graphic that shows (e.g., using bar graphs, numeric values, etc.) the shoe load distribution, enabling and/or prompting the operator to manipulate one or more combine harvester operator controls (e.g., joystick, buttons, switches, GUI menu items selected via cursor maneuvered by a mouse or other input device, or controls selected by voice activation or selected directly via touchscreen) based on the graphic to cause the shoe load distribution to change (e.g., by adjusting operator controls that cause adjustment of the hydraulic motors) and become more evenly distributed on the shoe 44. In some embodiments, the adjustments to the hydraulic motors may take place without operator intervention, with the transpiring of the adjustments shown graphically to the operator (or transparent to the operator in some embodiments).

Figure 9A:
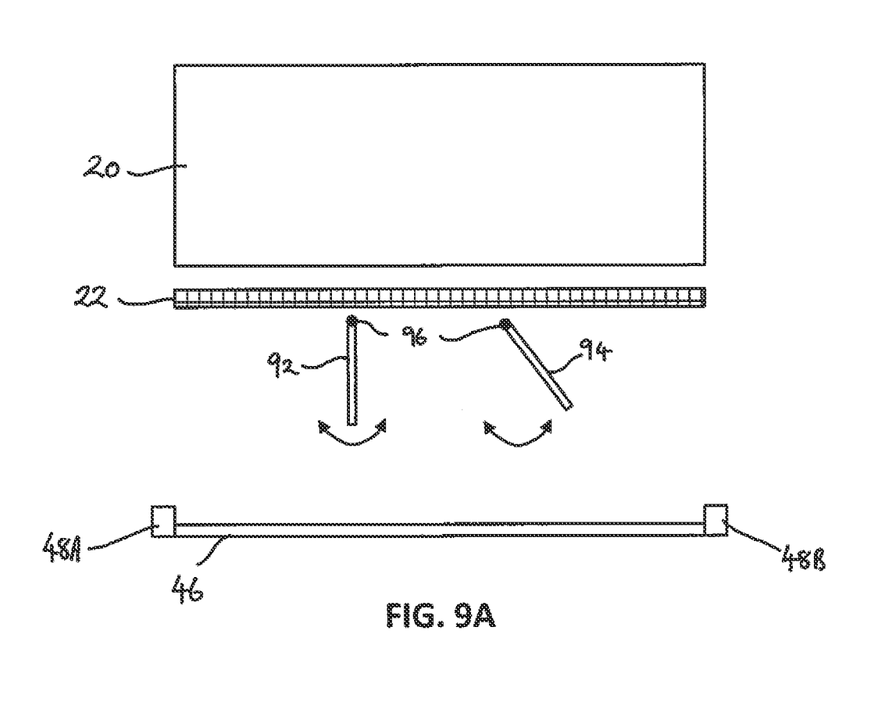
FIGS. 9A and 9B are block diagrams illustrating, in rear elevation view, example alternative distribution devices according to further embodiments of the invention.
Figure 9B:
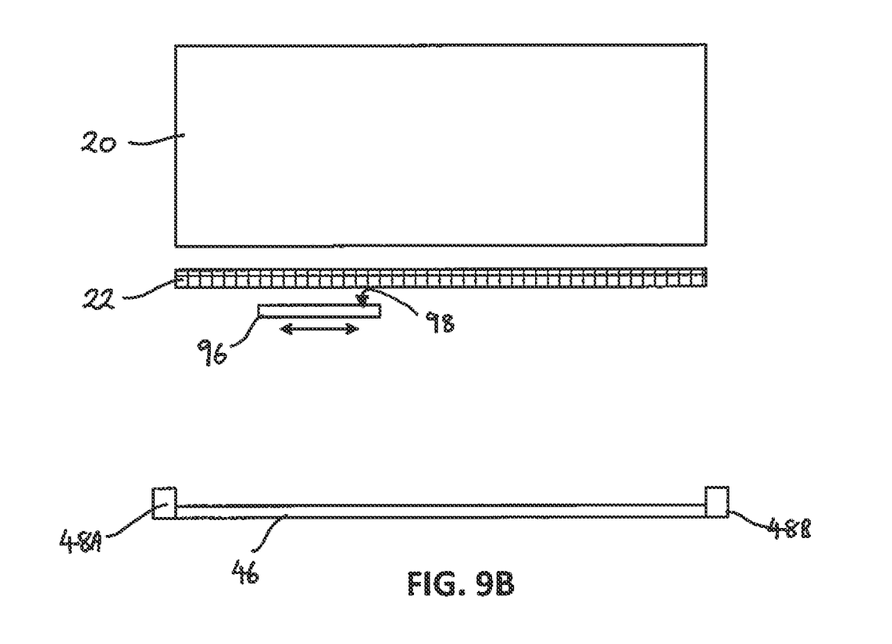

FIGS. 9A and 9B illustrate alternative distribution devices which are controllable to deflect grain falling from the thresher rotor assembly in a transverse direction above the pan 46. In FIG. 9A a pair of deflector plates 92, 94 are provided below the rotor cage 22. The top edge of each deflector plate 92, 94 pivots upon a respective longitudinal axis 96 so as to direct falling grain and MOG in a transverse, or sideways, direction. Independent actuators (not shown) are associated with each of the plates 92, 94 to control the pivoting movement of the plates. The extent of deflection is controlled in response to a sensed load across the width of the pan 46 below. Although a pair of deflector plates is illustrated, it is envisaged that more or less than two may be employed instead.

The embodiment of FIG. 9B comprises a distribution device in the form of a sliding plate 96 having an upward facing major surface 98 and disposed below the rotor cage 22. Again, an actuator (not shown) controls sideways movement of the plate 96 (to the left and right) to selectively block the passage of grain and MOG falling from the rotor 20 above. Although shown as a flat, the major surface 98 may be inclined to encourage collected grain and MOG to slide to the right or left.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A combine harvester comprising:
   a thresher rotor assembly having a thresher rotor and a grate, the thresher rotor having a transverse rotation axis with respect to a forward direction of travel of the harvester;
   a plurality of distribution devices disposed beneath the thresher rotor and each being independently controllable to deflect grain falling through the grate from the thresher rotor assembly in a transverse direction, wherein the plurality of independently controllable distribution devices comprise at least a pair of distribution stub augers;
   a plurality of hydraulic motors to drive the plurality of independently controlled distribution stub augers;
   a cleaning shoe comprising a pan upon which grain falling from the thresher rotor assembly impacts; and,
   plural sensors disposed adjacent the pan and each arranged to generate a signal indicative of crop load on the pan, wherein the plurality of distribution devices are controlled automatically in response to the generated load signals.

2. The combine harvester of claim 1, further comprising a valve fluidly coupled to the plurality of hydraulic motors and the plural sensors, the valve configured to:
   receive feedback from the plural sensors; and
   adjust fluid flow to at least one of the plurality of hydraulic motors based on the feedback.

3. The combine harvester of claim 1, further comprising:
   a valve fluidly coupled to at least one of the plurality of hydraulic motors; and
   a controller configured to receive feedback from the plural sensors and cause the valve to adjust fluid flow to the at least one of the plurality of hydraulic motors based on the feedback.

4. The combine harvester of claim 3, further comprising one or more hydraulic pumps coupled to the valve, wherein one of the one or more hydraulic pumps is configured to cause fluid flow to the at least one of the plurality of hydraulic motors through the valve.

5. The combine harvester of claim 3, further comprising an additional valve, wherein one of the valves is fluidly coupled to one of the plurality of hydraulic motors and the other valve is fluidly coupled to another of the plurality of hydraulic motors, wherein the controller is configured to signal each of the valves to control fluid flow adjustment.

6. A combine harvester comprising:
   a thresher rotor assembly having a thresher rotor and a grate, the thresher rotor having a transverse rotation axis with respect to a forward direction of travel of the harvester;
   a plurality of distribution devices disposed beneath the thresher rotor and each being independently controllable to deflect grain falling through the grate from the thresher rotor assembly in a transverse direction, wherein the plurality of independently controllable distribution devices comprise at least a pair of distribution stub augers;
   a cleaning shoe comprising a pan upon which grain falling from the thresher rotor assembly impacts;
   plural sensors disposed adjacent the pan and each arranged to generate a signal indicative of crop load on the pan, wherein the distribution device is controlled automatically in response to the generated load signals;

a controller configured to receive feedback from the plural sensors; and a plurality of electric motors configured to independently drive the plurality of independently controlled distribution conveyors based on signals from the controller, the controller configured to signal at least one of the plurality of electric motors based on the feedback.

7. The combine harvester of claim 6, further comprising accelerator rolls disposed beneath the plurality of distribution devices.

\* \* \* \* \*